H. A. SORRELL.
TIRE TOOL.
APPLICATION FILED APR. 3, 1917.

1,260,587.

Patented Mar. 26, 1918.

WITNESSES

INVENTOR
Henry A. Sorrell,
BY
ATTORNEY

UNITED STATES PATENT OFFICE.

HENRY A. SORRELL, OF ASHEVILLE, NORTH CAROLINA.

TIRE-TOOL.

1,260,587.  Specification of Letters Patent.  Patented Mar. 26, 1918.

Application filed April 3, 1917. Serial No. 159,472.

*To all whom it may concern:*

Be it known that I, HENRY A. SORRELL, a citizen of the United States, residing at Asheville, in the county of Buncombe and State of North Carolina, have invented certain new and useful Improvements in Tire-Tools, of which the following is a specification.

This invention has relation to tire tools and more particularly to an improved device for removing and replacing pneumatic tires.

The primary object of the invention is to provide a tool for engaging and lifting the portion of the tire directly adjacent the valve stem, whereby the valve stem will be withdrawn from its position in the wheel rim for permitting the remaining portion of the tire to be conveniently disengaged from the rim.

The invention further aims to provide a tool which is designed to quickly and expeditiously disengage the valve stem from its position without danger of injuring the valve stem; which will permit the two essential parts of the tool to be assembled after the same are mounted in operative position; and which will permit a leverage to be obtained whereby the operator may quickly pry the tire from the wheel rim.

A further object of this invention is the provision of a tire tool which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
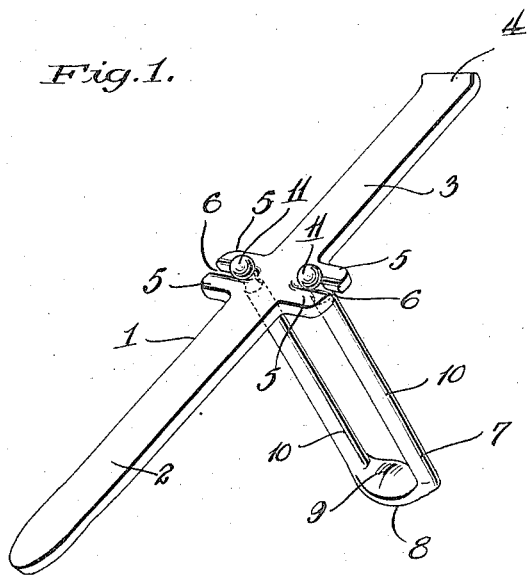
Figure 1 is a perspective view of the tool, showing the two essential parts in assembled position.
Figure 2:
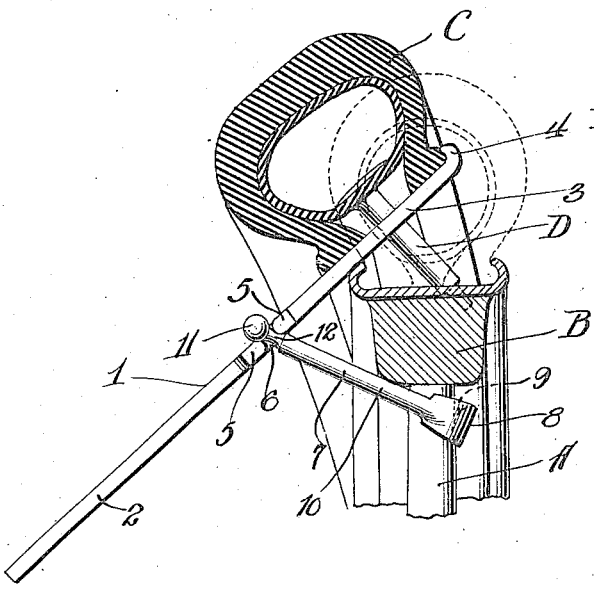
Fig. 2 is a detail section through a portion of a vehicle rim, and a pneumatic tire, showing the latter partially removed and the position of the tool for removing the same.

Referring to the drawing, wherein is illustrated the preferred form of my invention, and in which like numerals of reference indicate corresponding parts throughout the several views, the elongated piece 1 is provided for forming a handle 2 at one end and a pry-bar 3 at the opposite end. These are formed from a comparatively thin piece of metallic material, preferably hardened steel for giving strength to the tool. The end of the pry-bar 3 is provided with a lip 4 curved slightly toward one side of the tool. Intermediate the ends of the tool and projecting from each longitudinal marginal edge thereof is a pair of lugs 5, the lugs in each pair being spaced apart to provide the slots 6 having their outer extremities open. The opposite walls of each slot 6, formed by the opposed edges of the lugs 5 are curved as clearly shown by Fig. 2 of the drawing.

A retaining yoke 7 is provided for the purpose of engaging one of the spokes A attached to the wheel rim B. This yoke consists of a curved plate 8 designed to fit partially around the spoke A, and its inner engaging surface 9 is rounded as clearly shown by the dotted lines in Fig. 2 thereby permitting the yoke to rock when desired, when it is in the position shown by Fig. 2. The terminals of the plate 8 are integrally connected to the connecting arms 10 of the yoke. The extreme terminals of the arms are provided with spherical stop members 11. Directly adjacent the stop members 11, the arms 10 are restricted in diameter to provide the relatively small necks 12 of convexed configuration whereby they may fit in the slots 6 and engage the curved walls thereof in a manner that will permit pivotal movement of the pry-bar when the device is in operative position.

The plate 8 is sufficiently resilient to permit the arms 10 to be swung outwardly whereby the necks 12 may be removed from the slots 6, or placed in engagement therewith. To accomplish this, it is merely necessary to grasp the spherical stop members 11, and press the same away from each other so that the necks will be removed from the slots 6. The tendency of the spring action, however, is to retain the arms in parallelism so that they will normally be held in the ends of the slots 6.

In use, the pry-bar 3 will be thrust under the tire C at a point directly adjacent the valve stem D, the yoke, of course, having first been disconnected from the lugs. The operator will then press downwardly on the handle of the tool and the marginal edge of the rim B will act as a fulcrum to lift the tire at this point, and disengage the valve stem from its position in the wheel rim. The yoke will then be placed around the adjacent spoke A, and the necks 12 snapped into position in the slots 6. The yoke will then retain the pry-bar in the position shown by Fig. 2 of the drawing, so that the valve will be held in disengaged position, and a portion of the tire will be held in the position shown by full lines. The operator may simply grasp the tire and pull the remaining portion thereof from the rim by either running his hand or a convenient pulling hook around the tire, or by simply rotating the wheel and pulling the engaged portion of the tire from the rim as the wheel rotates.

From the foregoing it will be observed that a very simple and durable tire tool has been provided, the details of which embody the preferred form. I desire it to be understood however, that slight changes in the minor details of construction may be made without departing from the spirit of the invention or the scope of the claims hereunto appended.

I claim:

1. A tire tool comprising a pry-bar having oppositely disposed pairs of lugs integrally formed therewith and a retaining yoke including a pair of arms resiliently connected for permitting their free ends to engage and disengage the said lugs.

2. A tire tool comprising a pry-bar, a pair of lugs formed at opposite edges of the pry-bar and disposed to provide transversely alined slots, and a retaining yoke including a resilient plate having a pair of arms adapted to be received in the said slots.

3. A tire tool comprising a pry-bar, a pair of lugs formed at opposite edges of the pry-bar and disposed to provide transversely alined slots, a retaining yoke including a resilient plate having a pair of arms adapted to be received in the said slots, the terminals of the said arms being provided with spherical stop members, and necks formed adjacent the stop members and received in the said slots.

In testimony whereof I affix my signature in presence of two witnesses.

HENRY A. SORRELL.

Witnesses:
Jos. DOBBINS,
S. F. WILLIAMS.

Copies of this patent may be obtained for five cents each, by addressing the "Commissioner of Patents, Washington, D. C."